(12) United States Patent
Schober

(10) Patent No.: US 11,988,156 B2
(45) Date of Patent: May 21, 2024

(54) ENGINE ASSEMBLY AND METHOD OF OPERATION

(71) Applicant: Rolls-Royce Deutschland Ltd & Co KG, Blankenfelde-Mahlow (DE)

(72) Inventor: Peter Schober, Kleinmachnow (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 268 days.

(21) Appl. No.: 17/416,037

(22) PCT Filed: Dec. 12, 2019

(86) PCT No.: PCT/EP2019/084955
§ 371 (c)(1),
(2) Date: Jun. 18, 2021

(87) PCT Pub. No.: WO2020/126848
PCT Pub. Date: Jun. 25, 2020

(65) Prior Publication Data
US 2022/0065176 A1    Mar. 3, 2022

(30) Foreign Application Priority Data
Dec. 21, 2018 (DE) ............... 10 2018 222 890.6

(51) Int. Cl.
*F02C 9/26* (2006.01)
*F01D 15/10* (2006.01)
*F02C 6/14* (2006.01)

(52) U.S. Cl.
CPC ............... *F02C 9/26* (2013.01); *F01D 15/10* (2013.01); *F02C 6/14* (2013.01);
(Continued)

(58) Field of Classification Search
CPC ...... F02C 9/26; F02C 6/14; F02C 7/26; F02C 9/00; F01D 15/10; F05D 2220/323;
(Continued)

(56) References Cited

U.S. PATENT DOCUMENTS 5,932,940 A * 8/1999 Epstein .................. F01D 25/20
60/39.35
2009/0309364 A1* 12/2009 Marconi .................. F02C 6/00
290/52

(Continued)

FOREIGN PATENT DOCUMENTS

DE    10033736 A1    1/2002
EP    2344739 A1    7/2011
(Continued)

OTHER PUBLICATIONS

International Search Report and Written Opinion dated Mar. 19, 2020 from counterpart International Patent ApplicationNo. PCT/EP2019/084955.
(Continued)

*Primary Examiner* — David P. Olynick
(74) *Attorney, Agent, or Firm* — SHUTTLEWORTH & INGERSOLL, PLC; Timothy J. Klima

(57) ABSTRACT

A power plant assembly, including—a turbine for driving at least one rotor shaft; —a combustion chamber for generating drive energy for the turbine; —at least one electric machine which is coupled to the rotor shaft and can be operated both in a generator mode and in a motor mode; —and at least one energy storage system which is connected to the electric machine and can store energy generated by the electric machine when the electric machine is in generator mode. A set of control electronics of the power plant assembly is configured to operate the combustion chamber using a lean fuel-air mixture and, for this purpose, to selectively operate the at least one electric machine in generator mode or in (Continued)

motor mode, depending on the power to be applied by the power plant assembly.

15 Claims, 5 Drawing Sheets

(52) U.S. Cl.
CPC .... *F05D 2220/323* (2013.01); *F05D 2220/76* (2013.01); *F05D 2240/128* (2013.01); *F05D 2260/42* (2013.01)

(58) Field of Classification Search
CPC ........... F05D 2220/76; F05D 2240/128; F05D 2260/42; F05D 2260/85; F02K 3/06
See application file for complete search history.

(56) References Cited

U.S. PATENT DOCUMENTS

| | | | | |
|---|---|---|---|---|
| 2010/0288571 A1* | 11/2010 | Dewis | .................... | F01K 15/02 60/659 |
| 2012/0125008 A1* | 5/2012 | Prociw | .................... | F23R 3/346 60/776 |
| 2013/0098060 A1* | 4/2013 | Suciu | ........................ | F02C 7/36 60/783 |
| 2015/0367950 A1* | 12/2015 | Rajashekara | .......... | B64D 27/10 903/930 |
| 2017/0044989 A1 | 2/2017 | Gemin et al. | | |
| 2018/0002025 A1 | 1/2018 | Lents et al. | | |
| 2018/0178920 A1 | 6/2018 | Swann et al. | | |
| 2018/0230845 A1 | 8/2018 | Joshi et al. | | |
| 2020/0392924 A1* | 12/2020 | Turner | .................... | F02K 3/075 |
| 2022/0065176 A1* | 3/2022 | Schober | .................... | F02C 7/26 |
| 2022/0397067 A1* | 12/2022 | Greenberg | ............. | B64D 33/00 |
| 2023/0138892 A1* | 5/2023 | Wang | ...................... | B60L 58/34 60/773 |

FOREIGN PATENT DOCUMENTS

| | | | | |
|---|---|---|---|---|
| WO | | 0242611 A1 | 5/2002 | |
| WO | WO-0242611 A1 | * | 5/2002 | ............. F01D 15/10 |

OTHER PUBLICATIONS

German Search Report dated May 23, 2020 from counterpart German Patent Application No. 10 2018 222 890.6.

* cited by examiner

ENGINE ASSEMBLY AND METHOD OF OPERATION

This application is the National Phase of International Application PCT/EP2019/084955 filed Dec. 12, 2019 which designated the U.S.

This application claims priority to German Patent Application 102018222890.6 filed Dec. 21, 2018, the entirety of which is incorporated by reference herein.

DESCRIPTION

The proposed solution relates, in particular, to a power plant assembly having a turbine and at least one electric machine.

US 2018/0178920 A1 or US 2015/0367950 A1 has already disclosed the practice, in a power plant assembly for an airplane, of providing an electric machine in addition to a turbine in a power plant and of using the turbine of the power plant and the electric machine to drive an additional, electrically operated drive unit for the generation of the thrust. In this case, the solutions known from the two abovementioned documents are focused on hybrid drive systems and control electronics which aim above all for optimized operation of the electric machine or the avoidance of condensation trails during the operation of the power plant.

Given this background situation, there is a need for a solution which, while using an additional electric machine in the power plant zone, can achieve a reduction in emissions.

This object is achieved both with a power plant assembly of claim 1 and also with a method of claim 12.

Here, a proposed power plant assembly comprises a turbine for driving at least one rotor shaft, a combustion chamber for generating the driving energy for the turbine, and at least one electric machine, which is coupled to the rotor shaft and can be operated both in a generator mode and in a motor mode. Furthermore, at least one energy storage system, which is connected to the electric machine and can store energy generated by the electric machine in the generator mode of the electric machine, is provided. Control electronics of the power plant assembly are configured in such a way that the combustion chamber is operated with a lean fuel-air mixture and, for this purpose, the at least one electric machine is operated selectively in the generator mode or in the motor mode, depending on the power to be produced by the power plant assembly.

In the solution proposed, the control electronics can thus operate the electric machine selectively as a generator or as a motor, to be specific depending on the power to be produced by the power plant assembly. During the generator mode, at least some of the driving energy generated by the turbine is used to drive the electric machine and to store energy, in particular electric energy, in the energy storage system. The additional electric machine can thus be used to operate the turbine in a medium or high power range without having to use all the power generated during this process to drive the vehicle, e.g. an airplane, fitted with the power plant assembly.

Thus, precisely in a lower power range of a turbine, it is not generally possible to operate the upstream combustion chamber with a lean fuel-air mixture. On the contrary, in conventional power plant assemblies that can be operated with a lean fuel-air mixture, an extremely complex, multi-stage fuel distribution system and injection system has hitherto been necessary to ensure sufficient flame stability in the combustion chamber over relatively wide power ranges.

In contrast, it is possible, on the basis of the proposed solution, by appropriate control of the at least one additional electric machine, to ensure that the combustion chamber can be operated with a lean fuel-air mixture even when the actually demanded power of the power plant assembly is below a minimum power of the turbine that the turbine must output in order to maintain lean-mixture operation of the combustion chamber since otherwise there would be a risk of extinction of the flame in the combustion space. With the aid of the electric machine, it is possible to accept an excess of power produced by the turbine in order to ensure lean-mixture operation. Excess power is then used to drive the electric machine and to store (electric) energy in the energy storage system. Depending on the power to be produced, the electric machine is thus operated by means of the control electronics either as a generator or as a motor in order to be able to operate the turbine in a power range that is as narrow as possible without major fluctuations. Excess power can be removed via the electric machine operated as a generator and via the energy storage system. As a supplementary measure, it is possible in one design variant to assist in covering peaks in the demanded power by means of the electric machine operated as a motor. By means of the control electronics, a share, made available by the turbine, of the power to be produced by the power plant assembly is thus restricted, and hence the power of the turbine is limited (upward and downward) to such an extent that operation of the combustion chamber with a lean fuel-air mixture can be maintained in different power ranges of the power plant assembly.

In one design variant, for example, it is envisaged that the combustion chamber is designed and provided exclusively for operation with a lean fuel-air mixture, and the control electronics are configured to ensure operation of the combustion chamber with a lean fuel-air mixture by selective operation of the at least one electric machine in the generator mode or in the motor mode. Experience shows that operation with a lean fuel-air mixture is associated with comparatively extremely low emissions. By designing and providing the combustion chamber exclusively for such operation, the emissions behavior of a power plant can thus be influenced in a positive way. If the combustion chamber is designed and provided exclusively for operation with a lean fuel-air mixture, it is furthermore possible to implement a relatively simple fuel distribution system and a relatively simple injection system since additional operation with a rich fuel-air ratio would require more variable metering and admixture of fuel, for example.

A development envisages, for example, that the combustion chamber comprises an injection system having a plurality of fuel nozzles for injecting the lean fuel-air mixture, wherein all the fuel nozzles for the combustion chamber are connected to a fuel distributor which delivers a uniform quantity of fuel to all the fuel nozzles at all times. The fuel nozzles are thus supplied with fuel in an identical way. Consequently, the proposed design variant can avoid different fuel nozzles supplied during the operation of the power plant with different quantities of fuel, so as to ensure sufficient flame stability and avoid a flameout. On the contrary, an illustrative injection system comprises just one low-pressure pump, a high-pressure pump connected in series therewith, and a single fuel distributor with the same flow to all the fuel nozzles for the combustion chamber, e.g. an annular combustion chamber. Thus, there are, in particular, no fuel nozzles that have to be supplied with a rich fuel-air mixture and that would have to ensure the stability of the flame in the combustion space. On the contrary, by means of the appropriately operated additional electric machine, stable operation with a lean fuel-air mixture can be achieved without major power fluctuations.

The control electronics are, for example, configured to operate the at least one electric machine in the generator mode in a lower power range of the power plant assembly and to operate the electric machine in the motor mode in an upper power range of the power plant assembly. In this case, the electric machine can be supplied with electric energy by the energy storage system in the motor mode.

Alternatively or in addition, electric energy from the energy storage system can also be used to supply an additionally provided auxiliary drive unit. For example, the power plant assembly comprises at least one power plant having the turbine and additionally an auxiliary drive unit, which is connected to the energy storage system and can be supplied directly by the energy storage system. The auxiliary drive unit can thus be supplied with electric energy from the energy storage system in the motor mode of the at least one electric machine but also independently thereof and, for example, only as a function of a demanded power to be produced by the power plant assembly. By means of the at least one auxiliary drive unit, it is thus possible to use energy stored in the energy storage system to provide additional power when required without the need for this purpose of significantly varying an operating point of the combustion chamber and having to feed a non-lean fuel-air mixture to the combustion chamber, for example. Operation of the combustion chamber with a lean fuel-air mixture can thus be maintained even if different power levels, e.g. in the form of different levels of thrust in the case of an aircraft such as an airplane, are demanded. In particular, an additional driving force can be made available by means of the electric machine operated in the motor mode and/or by means of the at least one additional auxiliary drive unit.

In this context, the auxiliary drive unit, like the at least one turbine, is designed to generate a driving force for driving a (land, water or air) vehicle for which the power plant assembly is provided.

In principle, the control electronics can be configured to control an injection system of the power plant assembly and the at least one electric machine as well as the energy storage system in such a way that a fuel-air mixture with a fuel-air ratio in the range of 0.02 to 0.04 (based on the combustion chamber outlet and as an absolute ratio of the mass flows) is made available in the combustion chamber over all possible operating points of a vehicle fitted with the power plant assembly.

In principle, the control electronics can be configured, based on a determined fuel-air ratio in relation to a permissible minimum value, to determine a minimum power draw to avoid combustion chamber extinction. In this case, the control electronics are then used to ensure that the actual power draw is at or above a lower threshold for the maintenance of stability when more power or thrust is demanded by the power plant assembly and, in particular, by an overall system incorporating the power plant assembly. By means of appropriate control logic, it is then also possible, for example, to influence the transient behavior of the turbine, i.e. a delay is attenuated by the minimum value, for example, so as not to fall below an acceptable fuel-air ratio. There can likewise be an upper threshold above which a maximum emission of NOx is limited. In this case, it is possible in one design variant for example, to demand power from the energy storage system in order to avoid a briefly very high power and hence emissions from the turbine. Here, an upper threshold can be restricted to operating situations of the power plant in which energy is available in the energy storage system. In each case, it is possible here to reduce takeoff emissions in normal operation, for example.

The control electronics comprise, for example, combustion temperature control electronics which are designed and provided for controlling the generator mode of the at least one electric machine and for controlling feeding of electric energy to the energy storage system. Here, the combustion temperature control electronics are configured to avoid a flameout in a combustion chamber into which the lean fuel-air mixture is injected. In this case, the combustion temperature control electronics, optionally in combination with at least one sensor that directly or indirectly detects the temperature in the combustion chamber, ensures that a minimum temperature for the ignition of the lean fuel-air mixture is not undershot. For this purpose, the at least one electric machine is controlled for operation as a generator, and therefore the electric machine forms an additional load on the at least one rotor shaft driven by the turbine. This enables the turbine to be operated at a relatively high power and thus relatively high temperature in the combustion chamber even though this power is not currently (all) required to generate a driving force, e.g. to generate the thrust in an airplane.

Alternatively or in addition, the control electronics can have power management electronics for the energy storage system. Power management electronics of this kind are then configured, for example, to control the output of energy stored in at least one energy storage device of the energy storage system. In this way, for example, the power management electronics ensure that the at least one energy storage device of the energy storage system has sufficient capacity for storage and that sufficient stored energy is output and, for example, used to supply at least one additionally provided auxiliary drive unit in those phases in which the electric machine supplies electric energy to the energy storage system. It is possible, for example, for energy stored in the energy storage system to be used to supply the at least one electric machine and/or at least one auxiliary drive unit when an airplane fitted with the power plant assembly is taking off. In particular, it is possible during this process for the electric machine operated in the motor mode to be used to drive a fan coupled to the rotor shaft.

In principle, the power plant assembly can be designed and provided for use in a land vehicle, watercraft or aircraft. In particular, an airplane having at least one power plant assembly according to the proposed solution can be made available.

Another aspect of the proposed solution relates to a method for operating a power plant, where it is envisaged that the power plant comprises a turbine which drives at least one rotor shaft, the combustion chamber of the power plant is provided for generating the driving energy for the turbine, at least one electric machine of the power plant is coupled to the rotor shaft and can be operated both in a generator mode and in a motor mode, and at least one energy storage system is provided, which is connected to the electric machine and can store energy generated by the electric machine in the generator mode of the electric machine.

Here, the combustion chamber is operated with a lean fuel-air mixture and, for this purpose, the at least one electric machine is operated selectively in the generator mode or in the motor mode, depending on the power to be produced by the power plant assembly.

Accordingly, a proposed method can be implemented by a design variant of a proposed power plant assembly. Advantages and features mentioned above and below for design variants of a proposed power plant assembly thus also apply to design variants of a proposed method, and vice versa.

In particular, one design variant of a proposed (operating) method can envisage that the combustion chamber is designed and provided exclusively for operation with a lean fuel-air mixture, and the operation of the combustion chamber with a lean fuel-air mixture across all possible operating points of the power plant is ensured by selective operation of the at least one electric machine in the generator mode or in the motor mode. This includes the possibility, for example, that, in a lower power range of the power plant, the at least one electric machine is operated in the generator mode and thereby stores energy in at least one energy storage device of the energy storage system, and in an upper power range of the power plant, the at least one electric machine is operated in the motor mode and energy made available by means of the energy storage system is used to operate the electric machine and/or to operate at least one additionally provided auxiliary drive unit.

Another aspect of the proposed solution furthermore provides a power plant assembly in which a turbine is used to drive an electric machine in the generator mode, and a further electric machine or a plurality of further electric machines is used in the motor mode to generate the thrust in a power plant. In other words, the (gas) turbine is, in particular, not embodied as a turbofan with its own thrust generation in this variant. On the contrary, the at least one further electric machine is provided to generate the thrust. By means of control electronics, the at least one electric machine coupled to the rotor shaft and the at least one further electric machine are controlled in such a way in order to generate the thrust as a function of the power to be produced by the power plant assembly that the combustion chamber of the turbine is operated with a lean fuel-air mixture, in particular with a lean fuel-air mixture at all times.

The appended figures illustrate, by way of example, possible design variants of the proposed solution.

Figure 4:
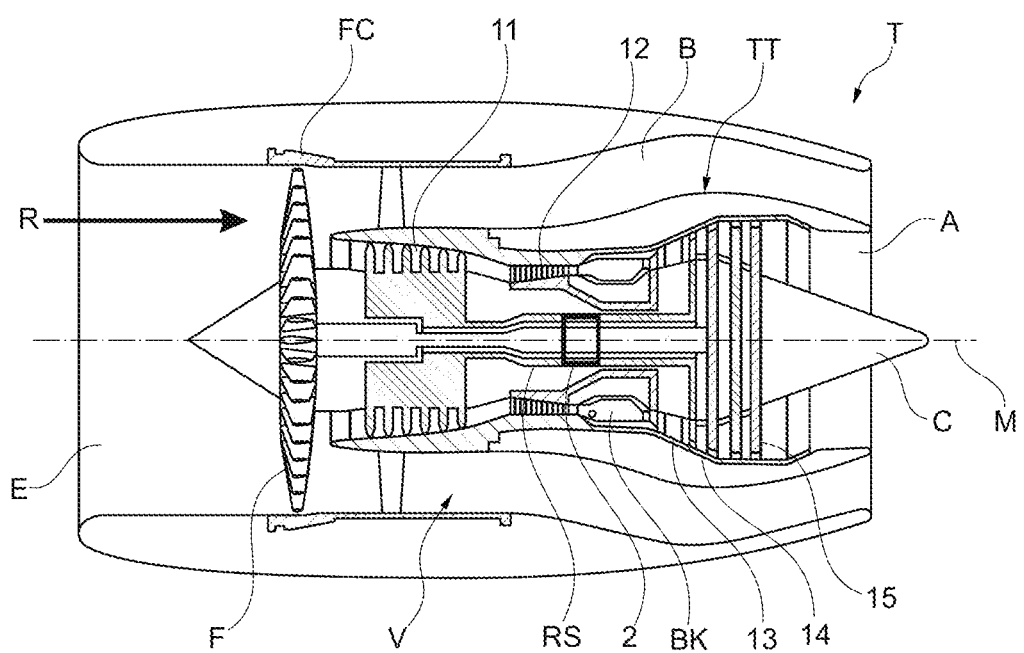
FIG. 4 shows the power plant of FIGS. 1 and 2 in a sectional view and with a greater level of detail.

FIG. 4 illustrates, schematically and in a cross-sectional view, a gas turbine power plant T in which the individual power plant components are arranged successively along an axis of rotation or central axis M. The power plant T is designed by way of example as a turbofan engine. At an inlet or intake E of the power plant T, air is drawn in along an inlet direction R by means of a fan F. This fan F, which is arranged in a fan casing FC, is driven by means of a rotor shaft RS which is set in rotation by a turbine TT of the power plant T. The turbine TT here adjoins a compressor V, which has, for example, a low-pressure compressor 11 and a high-pressure compressor 12, and optionally also a medium-pressure compressor. The fan F supplies air to the compressor V on the one hand and to a secondary flow duct or bypass duct B on the other, in order to generate thrust. The bypass duct B runs here around a core engine, which comprises the compressor V and the turbine TT and comprises a primary flow duct for the air supplied to the core engine by the fan F.

The air fed into the primary flow duct via the compressor V enters a combustion chamber section BK of the core engine, in which the driving energy for driving the turbine TT is generated. For this purpose, the turbine TT has a high-pressure turbine 13, a medium-pressure turbine 14 and a low-pressure turbine 15. The energy released during the combustion is used here by the turbine TT to drive the rotor shaft RS and thus the fan F in order to generate the required thrust by means of the air conveyed into the bypass duct B. Both the air from the bypass duct B and the exhaust gases from the primary flow duct of the core engine flow out via an outlet A at the end of the power plant T. In this arrangement, the outlet A generally has a thrust nozzle with a centrally arranged outlet cone C.

In principle, the fan F may also be coupled via a connecting shaft and an epicyclic planetary transmission to the low-pressure turbine 15, and be driven by the latter. It is furthermore also possible to provide other, differently designed gas turbine power plants in which the proposed solution can be used. For example, such power plants may have an alternative number of compressors and/or turbines and/or an alternative number of connecting shafts. As an example, the power plant may have a split-flow nozzle, meaning that the flow through the bypass duct B has its own nozzle, which is separate from and situated radially outside the core engine nozzle. However, this is not limiting, and any aspect of the present disclosure may also apply to power plants in which the flow through the bypass duct B and the flow through the core are mixed or combined before (or upstream of) a single nozzle, which may be referred to as a mixed-flow nozzle. One or both nozzles (whether mixed or split flow) can have a fixed or variable area. While the example described relates to a turbofan engine, the proposed solution may be applied for example to any type of gas turbine power plant, such as an open-rotor engine (in which the fan stage is not surrounded by an engine nacelle) or a turboprop engine.

An electric machine 2 is additionally provided on the rotor shaft RS of the power plant T of FIG. 4. The electric machine 2 is coupled to the rotor shaft RS and can be operated both in a generator mode and in a motor mode. Accordingly, it is possible, by a rotation of the rotor shaft RS on the electric machine, to generate electric energy when the electric machine 2 is operated as a generator. If the electric machine 2 is operated as a motor, it can generate an (additional) driving force at the rotor shaft RS for the purpose of driving the fan F.

Figure 5:
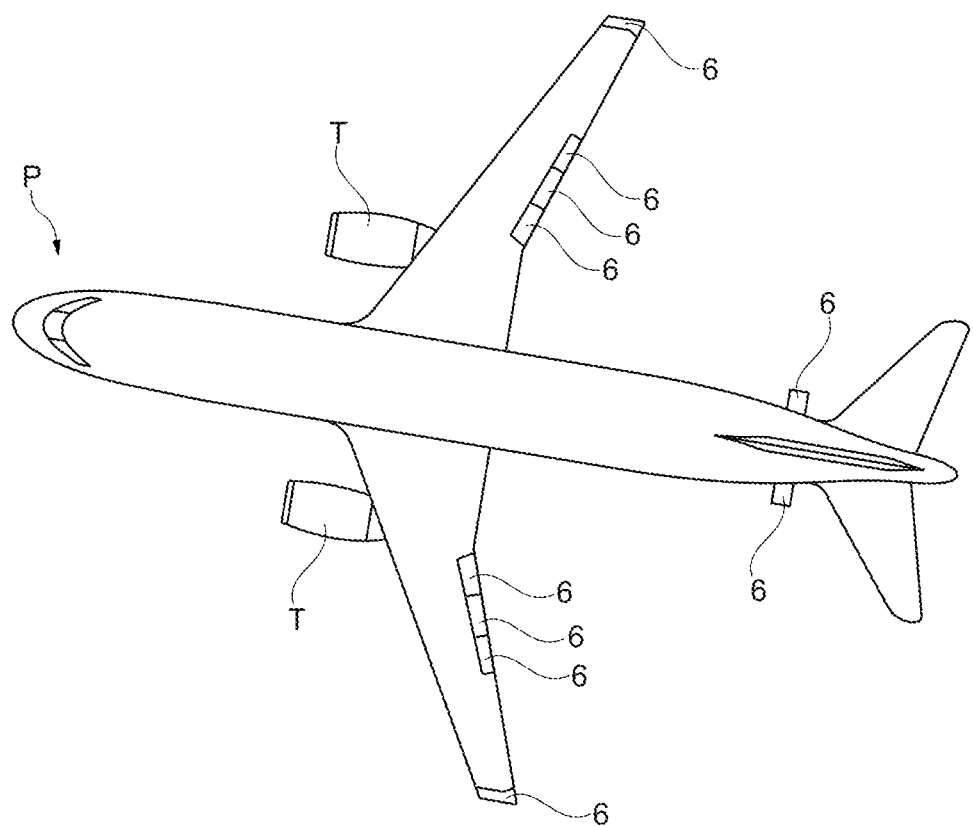
FIG. 5 shows schematically an airplane having two power plants in accordance with FIGS. 1, 2 and 4 and a plurality of auxiliary drive units in accordance with FIG. 1.

When using the power plant T on an airplane P in accordance with the schematic illustration in FIG. 5, the electric machine 2 can also be used to supply additionally provided auxiliary drive units 6. These electrically operated auxiliary drive units 6 are likewise provided for the purpose of generating thrust on the airplane P. By way of example, a plurality of auxiliary drive units 6 is provided on a trailing edge of a wing of the airplane P in FIG. 5. Moreover, it is possible for an auxiliary drive unit 6 to be provided on a wingtip of a wing of the airplane P and/or on the rear part of a fuselage of the airplane P.

The interaction of the electric machine 2, the combustion chamber section BK and the turbine TT of the power plant T and optionally at least one auxiliary drive unit 6 within a power plant assembly comprising the power plant T and at least one auxiliary drive unit 6 will be explained in greater detail below, in particular, with reference to FIGS. 1 to 3.

Figure 1:
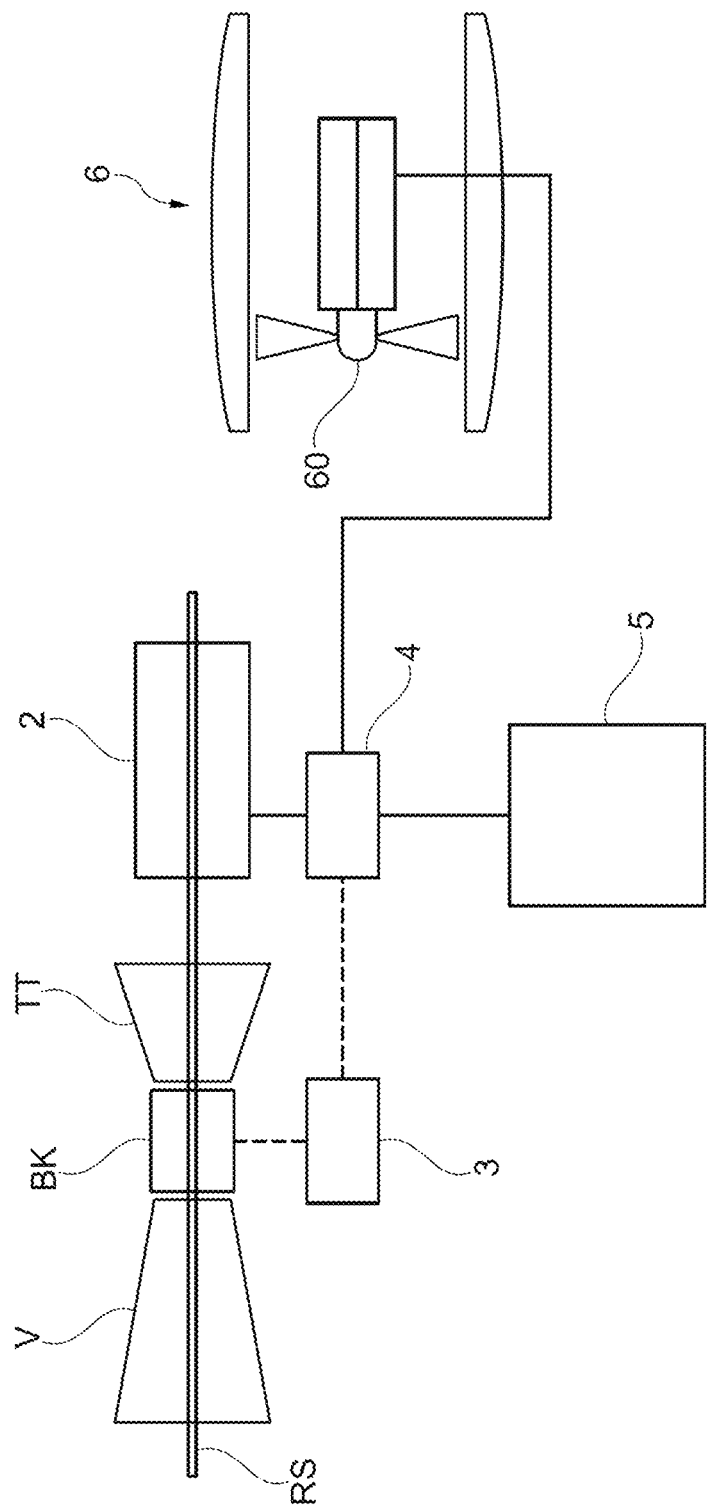
FIG. 1 shows schematically one design variant of a proposed power plant assembly having a power plant which includes an electric machine and having an additional, electrically driven auxiliary drive unit.
Figure 2:
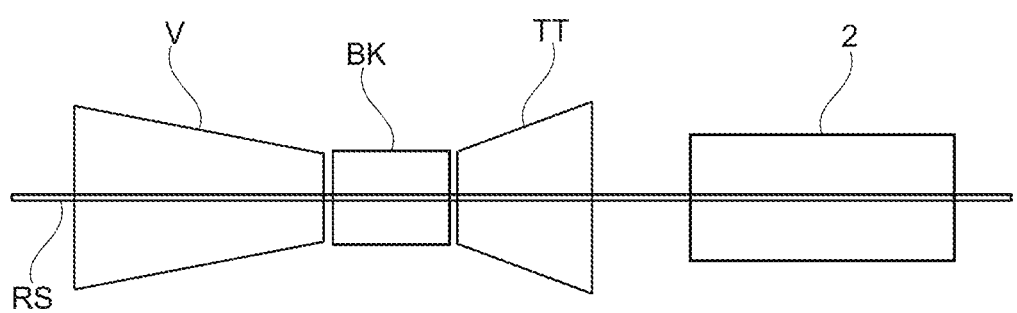
FIG. 2 shows the power plant of FIG. 1 schematically in isolation.

For this purpose, FIG. 1 shows schematically one design variant of a power plant assembly, e.g. for the airplane P in FIG. 5. In addition to the compressor V, the combustion chamber section BK and the turbine TT, this power plant assembly comprises the electric machine 2 provided on the common rotor shaft RSS. The electric machine 2 and the turbine TT are operated in interaction by means of control electronics 3, 4 in such a way that a combustion chamber of the combustion chamber section BK is supplied exclusively with a lean fuel-air mixture and the electric machine is operated either as a generator or a motor. Thus, for example, a generator mode of the electric machine is recommended when high power is not required by the power plant T but there is a continued requirement for a relatively high power in the turbine TT in order to avoid a flameout in the case of supply with a lean fuel-air mixture. In the motor mode, the electric machine 2 can, in turn, assist rotation of the rotor shaft RS. As an alternative or in addition, it is possible to drive one or more of the auxiliary drive units 6 by means of an energy storage system in the form of a power storage system 5 that has been supplied with electric energy in the generator mode of the electric machine 2. A fan 60 of an auxiliary drive unit 6 of this kind then makes available additional thrust for the airplane P, for example.

In addition to combustion temperature control electronics 3, the control electronics 3, 4 in FIG. 1 comprises power management electronics 4. The combustion temperature control electronics 3 serves to control the generator mode of the electric machine 2 and to feed electric energy to the power storage system 5 and, in this case, is configured to avoid a flameout in a combustion chamber of the combustion chamber section BK into which the lean fuel-air mixture is injected. The power management electronics 4, in turn, serve primarily to control the power storage system 5. The power management electronics 4 is configured to control the output of energy stored in at least one energy storage device of the energy storage system 5 to an auxiliary drive unit 6, thus ensuring that there is sufficient capacity available to store electric energy in a generator mode of the electric machine 2. Thus, while the combustion temperature control electronics, electronically controlled as a function of a temperature in the combustion chamber of the combustion chamber section BK for example, ensure that a load or a protective torque from the electric machine 2 allows lean-mixture operation of the combustion chamber without major power fluctuations, the power management electronics 4 are designed and configured electronically to store and distribute the energy supplied by the electric machine 2, with the result that there is sufficient charging capacity available in the generator mode of the electric machine 2.

By virtue of the provision of the additional electric machine 2 in the power plant TT and the continuous operation, thereby made possible, of the combustion chamber with a lean fuel-air mixture across all operating points to be mapped, the combustion chamber can be designed and provided exclusively for operation with a lean fuel-air mixture. This then also allows the provision of a fuel distributor and injection system of relatively simple configuration. This is illustrated by way of example with reference to FIG. 3.

Figure 3:
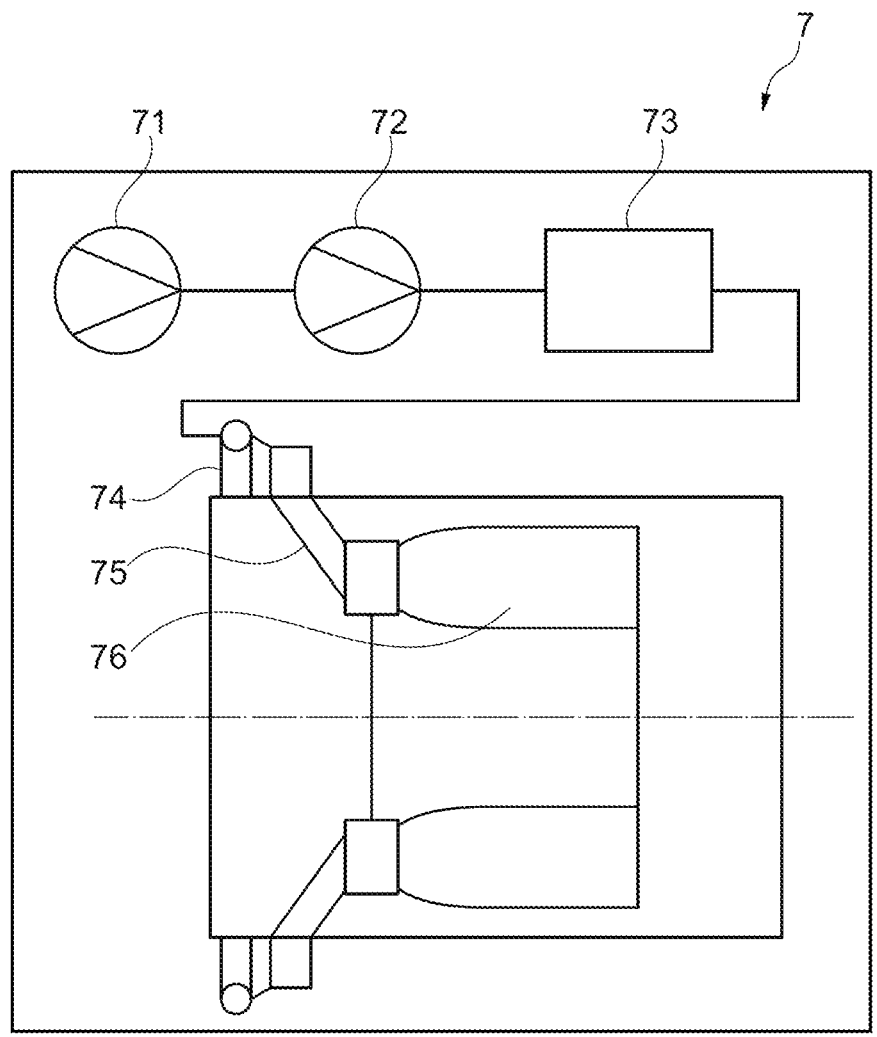
FIG. 3 shows a combustion chamber unit having an injection system for a combustion chamber of the power plant of FIGS. 1 and 2.

Here, FIG. 3 shows a combustion chamber unit 7 for the combustion chamber section BK of the power plant T having a fuel distributor system and an injection system. Inter alia, the fuel distributor system comprises a low-pressure pump 71 and a high-pressure pump 72 connected thereto for delivering the fuel. From the high-pressure pump, the fuel enters the metering device 73 of the fuel distributor system for metering the fuel quantity appropriate to the desired power. From the metering device 73, the specified quantity of fuel is distributed uniformly, via a fuel distributor 74, to fuel nozzles 75 of an injection system comprising a plurality of fuel nozzles 75. These fuel nozzles 75 are arranged in a distributed manner at one end of an annular combustion chamber 76 of the combustion chamber section BK. Via the fuel nozzles 75, the lean fuel-air mixture is injected into the combustion chamber 76.

The fuel distributor and injection systems provided for the power plant T are thus of relatively simple configuration. All the fuel nozzles 75 are supplied with a uniform quantity of fuel. Since, by virtue of the electric machine 2, the turbine TT can always be operated in a power range that is as narrow as possible, the avoidance of a flameout does not require any rich zones within the combustion chamber 76 using fuel nozzles of special configuration and/or needing to be supplied with an increased quantity of fuel. Metering of different fuel quantities, depending on which fuel nozzles 75 are to be supplied with fuel, is thus not necessary. On the contrary, the interaction between the control electronics 3, 4, the electric machine 2 and the power storage system 5 ensures that the driving energy for the turbine TT is generated by the injection of a fuel-air mixture which is always lean.

In one design variant, it can furthermore be envisaged that there is no fan F connected to the rotor shaft RS for its own thrust generation. On the contrary, the turbine TT would here serve exclusively to drive at least one electric machine 2, by which (and/or by the power storage system 5), in turn, one or more further electric machines of one or more auxiliary drive units 6 are supplied with energy in order to generate the thrust.

LIST OF REFERENCE SIGNS

11 Low-pressure compressor
12 High-pressure compressor
13 High-pressure turbine
14 Medium-pressure turbine
14 Low-pressure turbine
15 Electric machine
2 Combustion temperature control electronics
3 Power management electronics
4 Power storage system (energy storage system)
6 Auxiliary drive unit
60 Fan
7 Combustion chamber unit
71 Low-pressure pump
72 High-pressure pump
73 Metering device
74 Fuel distributor
75 Fuel nozzle
76 Combustion chamber
A Outlet
B Bypass duct
BK Combustion chamber section
E Inlet/Intake
F Fan
M Central axis/axis of rotation P Airplane
R Inlet direction
RS Rotor shaft
T Gas turbine power plant
TT Turbine
V Compressor

The invention claimed is:

1. A power plant assembly, with
a turbine for driving at least one rotor shaft,
a combustion chamber for generating the driving energy for the turbine,
at least one electric machine, which is coupled to the rotor shaft and which is operable both in a generator mode and in a motor mode, and
at least one energy storage system, which is connected to the at least one electric machine, that stores energy generated by the at least one electric machine in the generator mode of the at least one electric machine,
control electronics which are configured to operate the combustion chamber above a permissible minimum value to ensure that the combustion chamber is operated with a lean fuel-air mixture when demanded power of the power plant assembly is below a minimum power of the turbine needed to maintain a lean-mixture operation of the combustion chamber by determining conditions in the combustion chamber, by determining a minimum power draw to avoid combustion chamber extinction and, by operating the at least one electric machine selectively in the generator mode or in the motor mode, depending on the power to be produced by the power plant assembly, as follows,
in the generator mode, to add to a total power draw on the turbine, when a propulsive power draw on the turbine would otherwise fall below a value to maintain the permissible minimum value, and
in the motor mode, to decrease the total power draw on the turbine, when the propulsive power draw on the turbine is otherwise sufficiently above a value to maintain the permissible minimum value during a decrease in the total power draw on the turbine due to the operation of the at least one electric machine in the motor mode.

2. The power plant assembly as claimed in claim 1, wherein the combustion chamber is configured exclusively for operation with the lean fuel-air mixture, and the control electronics are configured to ensure operation of the combustion chamber with the lean fuel-air mixture by selective operation of the at least one electric machine in the generator mode or in the motor mode.

3. The power plant assembly as claimed in claim 1, wherein the combustion chamber comprises an injection system including a plurality of fuel nozzles for injecting the lean fuel-air mixture, wherein all of the plurality of fuel nozzles are connected to a fuel distributor which delivers a uniform quantity of fuel to all of the plurality of fuel nozzles at all times.

4. The power plant assembly as claimed in claim 1, wherein the control electronics are configured to operate the at least one electric machine in the generator mode in a lower power range of the power plant assembly and to operate the electric machine in the motor mode in an upper power range of the power plant assembly.

5. The power plant assembly as claimed in claim 4, wherein the electric machine is supplied with electric energy by the energy storage system in the motor mode.

6. The power plant assembly as claimed in claim 1, wherein the power plant assembly comprises at least one power plant having the turbine and additionally at least one auxiliary drive unit, wherein the auxiliary drive unit is connected to the energy storage system, thus enabling the auxiliary drive unit to be supplied with energy by the energy storage system.

7. The power plant assembly as claimed claim 1, wherein the control electronics include combustion temperature control electronics for controlling the generator mode of the at least one electric machine and feeding electric energy to the energy storage system, the combustion temperature control electronics being configured to avoid a flameout in the combustion chamber into which the lean fuel-air mixture is injected.

8. The power plant assembly as claimed in claim 1, wherein the control electronics include power management electronics for the energy storage system which are configured to control an output of energy stored in at least one energy storage device of the energy storage system.

9. The power plant assembly as claimed in claim 1, wherein the power plant assembly is configured for use in a land vehicle, watercraft or aircraft.

10. An airplane having at least one power plant assembly as claimed in claim 1.

11. A method for operating a power plant, comprising:
providing:
the power plant comprising a turbine which drives at least one rotor shaft,
a combustion chamber of the power plant for generating a driving energy for the turbine,
at least one electric machine of the power plant coupled to the rotor shaft and operable both in a generator mode and in a motor mode, and
at least one energy storage system, which is connected to the at least one electric machine to store energy generated by the at least one electric machine in the generator mode of the electric machine,
operating the combustion chamber above a permissible minimum value to ensure that the combustion chamber is operated with a lean fuel-air mixture when demanded power of the power plant assembly is below a minimum power of the turbine needed to maintain a lean-mixture operation of the combustion chamber by determining conditions in the combustion chamber, by determining a minimum power draw to avoid combustion chamber extinction and, by operating the at least one electric machine selectively in the generator mode or in the motor mode, depending on the power to be produced by the power plant assembly, as follows;
in the generator mode, to add to a total power draw on the turbine, when a propulsive power draw on the turbine would otherwise fall below a value to maintain the permissible minimum value, and
in the motor mode, to decrease the total power draw on the turbine, when the propulsive power draw on the turbine is otherwise sufficiently above a value to maintain the permissible minimum value during a decrease in the total power draw on the turbine due to the operation of the at least one electric machine in the motor mode.

12. The method as claimed in claim 11, wherein the combustion chamber is configured exclusively for operation with the lean fuel-air mixture, and the operation of the combustion chamber with the lean fuel-air mixture across all possible operating points of the power plant is performed by selective operation of the at least one electric machine in the generator mode or in the motor mode.

13. The method as claimed in claim 12, wherein in a lower power range of the power plant, the at least one electric machine is operated in the generator mode and thereby stores energy in at least one energy storage device of the energy storage system, and in an upper power range of the power plant, the at least one electric machine is operated in the motor mode and energy made available by the energy storage system is used to operate at least one chosen from the electric machine and at least one additionally provided auxiliary drive unit.

14. The power plant assembly as claimed in claim 11, wherein the wherein the permissible minimum value is based on the total power draw and a minimum combustion temperature.

15. The power plant assembly as claimed in claim 1, wherein the permissible minimum value is based on the total power draw and a minimum combustion temperature.

* * * * *